United States Patent
Lehongre (10) Patent No.: US 7,315,909 B2
(45) Date of Patent: Jan. 1, 2008

(54) HIERARCHIZED ARBITRATION METHOD

(75) Inventor: Denis Lehongre, Pontcharra (FR)

(73) Assignee: STMicroelectronics S.A., Montrouge (FR)

( * ) Notice: Subject to any disclaimer, the term of this patent is extended or adjusted under 35 U.S.C. 154(b) by 31 days.

(21) Appl. No.: 11/039,644

(22) Filed: Jan. 19, 2005

(65) Prior Publication Data

US 2005/0182878 A1   Aug. 18, 2005

(30) Foreign Application Priority Data

Jan. 19, 2004   (FR) .................................. 04 00418

(51) Int. Cl.
*G06F 13/42* (2006.01)
*G06F 12/00* (2006.01)
*G06F 13/36* (2006.01)

(52) U.S. Cl. ...................... 710/105; 710/240; 710/243; 710/244; 710/241; 710/113; 710/114; 710/115; 710/116

(58) Field of Classification Search ........ 710/240–244, 710/107–125
See application file for complete search history.

(56) References Cited

U.S. PATENT DOCUMENTS

| | | | | |
|---|---|---|---|---|
| 5,230,054 A | | 7/1993 | Tamura | 395/725 |
| 5,832,278 A | * | 11/1998 | Pham | 710/243 |
| 5,884,051 A | * | 3/1999 | Schaffer et al. | 710/107 |
| 5,926,628 A | * | 7/1999 | Tran et al. | 710/113 |
| 6,092,137 A | | 7/2000 | Huang et al. | 710/111 |
| 6,199,124 B1 | | 3/2001 | Ramakrishnan et al. | 710/40 |
| 6,304,923 B1 | * | 10/2001 | Klein | 710/41 |
| 6,647,449 B1 | * | 11/2003 | Watts | 710/111 |
| 6,804,736 B2 | * | 10/2004 | Olarig | 710/240 |
| 6,925,520 B2 | * | 8/2005 | Ma et al. | 710/317 |
| 6,961,793 B2 | * | 11/2005 | Kato | 710/113 |
| 6,985,985 B2 | * | 1/2006 | Moss | 710/240 |
| 7,062,582 B1 | * | 6/2006 | Chowdhuri | 710/116 |
| 2004/0193667 A1 | * | 9/2004 | Lehongre | 708/400 |
| 2005/0246464 A1 | * | 11/2005 | Barrick | 710/243 |

* cited by examiner

*Primary Examiner*—Paul R. Myers
*Assistant Examiner*—Brian Misiura
(74) *Attorney, Agent, or Firm*—Lisa K. Jorgenson; Dennis M. de Guzman; Seed IP Law Group PLLC (57) ABSTRACT

An arbitration method, for a data bus in an architecture having n functional blocks, regulates access to the bus. The method includes: receiving, at one of plural agents, information from one of the functional blocks via high level primitives. Each agent generates in response a critical rank vector comprising at least first and second components. An arbitrator receives the critical rank vectors generated by rival the agents and applies a maximum or minimum extracting mechanism to at least one of the two components of the critical rank vectors to uniquely identify the block accessing the resource. Thus, functional blocks can be separated from arbitration control, the agents implementing the arbitration control and being solely responsible for it.

23 Claims, 4 Drawing Sheets

HIERARCHIZED ARBITRATION METHOD

BACKGROUND OF THE INVENTION

1. Field of the Invention

The present invention relates to data transfer systems integrated into a semiconductor product communicating via a data transfer device, and in particular through an arbitration process in an architecture comprising various functional units.

2. Description of the Related Art

With the development of microelectronics, more and more functions are now integrated within a single semiconductor product, be it telecommunication functions (Ethernet, wireless communications) or sophisticated data processing, generally using sophisticated processors for signal processing.

The development of complete systems, embedded on a single chip, is spreading. Such on-chip systems include multiple functions within a single semiconductor product and in particular advanced multi-media functions, and there are even telephones offering sophisticated audio processing, such as MP3 (mpeg1 layer 3) reading.

Figure 1:
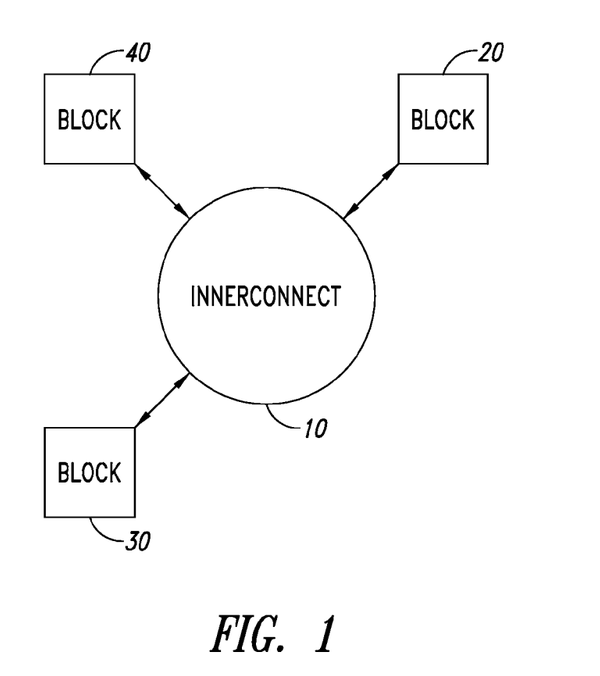
FIG. 1 illustrates the communication of a set of functional blocks arranged on a single semiconductor product and communicating via an interconnect.

The accumulation of various functional blocks within a single circuit poses the problem of inter-communicability between these functional blocks, which is in general ensured by an interconnect, managed by an arbitration mechanism, such as shown in FIG. 1, where there is an interconnect 10 communicating with three functional blocks 20, 30 and 40, respectively.

The evolution of technologies and the constant renewal of consumer products force to permanently redesign system general architectures and, generally for known systems, each time it is necessary to re-examine the whole architecture, and in particular the arbitration mechanism of the interconnect that is an essential element thereof.

As a result, development teams waste a great amount of time, which is detrimental to the renewal of product ranges and quick launching of new products.

It would be desirable to standardize certain aspects of the architecture of on-chip systems, in particular in order to make re-use of the interconnect arbitration function easier within a complete on-board system, allowing easy modifications of said architecture.

BRIEF SUMMARY OF THE INVENTION

One embodiment of this invention makes on chip systems design easier, using an interconnect arbitration protocol that is both standardized and easily reusable for new functional blocks.

The embodiment optimizes the architecture of a data processing system using a new arbitration mechanism allowing intercommunicability between the functional blocks existing in the architecture.

Another embodiment of this invention provides a standardized protocol for arbitrating and managing interconnect resources within an on-chip system.

One embodiment of the invention is directed to a data bus arbitration method in an architecture comprising n functional blocks, the access to the bus being regulated by an arbitration block.

The method comprises the following elements:

at least one agent receiving information from one of said functional blocks via high level primitives, and each generating in response a critical rank vector comprising at least a first and a second component;

an arbitrator receiving the critical rank vectors generated by the rival agents, the arbitrator applying a maximum or minimum extraction mechanism to at least one of the components of the critical rank vectors to uniquely identify the block accessing the resource.

Thus, functional blocks can be dissociated from the arbitration command that is now specifically dedicated to the agents using it.

As a result, an essential function present in on-chip systems is thus rationalized, namely the arbitration function. Thanks to the invention, without any modification, it is now possible to use and re-use standardized functional blocks that will communicate easily with the data transfer device or interconnect.

Preferably, the high level protocol comprises commands allowing the transmission of information relating to the amount of data to be transmitted, time, rate or minimum latency.

In a particular embodiment, the high level protocol comprises a command allowing purging of a FIFO memory included into one of said agents.

The invention is particularly adapted to implement an extractor of maximum or minimum, in particular based on a conversion function (T-transform) of each component of said critical rank vector, each component being in the form $B[n-1]\ B[n-2]\ \ldots\ B[2]\ B[1]\ B[0]$, where a ranking relationship is defined and is transformed into a binary number composed of $2^n-1$ binary elements $T[x]$ with $x=1$ to $2^n-1$:

$$T[2^n-1]\ T[2^n-2]\ \ldots\ T[x]\ \ldots\ T[2]\ T[1]$$

Where $T(x)=0$ when x is strictly higher than R and $T(x)=1$ when x is lower than or equal to R, with R being the rank of vector $B[n-1]\ B[n-2]\ \ldots\ B[2]\ B[1]\ B[0]$ in said ranking relationship.

Alternatively, the invention allows realization of a semiconductor product (or on-chip system) architecture, comprising a set of functional blocks organized around a data transfer device or <<interconnect>>. Each functional block concurrently requests access to the interconnect by means of an agent that receives information from said block via a high level protocol comprising at least rate or time information. The agent interprets this information and generates a critical rank vector comprising at least two components, which could be easily handled by the arbitration mechanism.

BRIEF DESCRIPTION OF THE SEVERAL VIEWS OF THE DRAWINGS

Other features, objects and advantages of the invention will appear when reading the following description and drawings, only given by way of nonrestrictive examples. In the accompanying drawings.

DETAILED DESCRIPTION OF THE INVENTION

Figure 2:
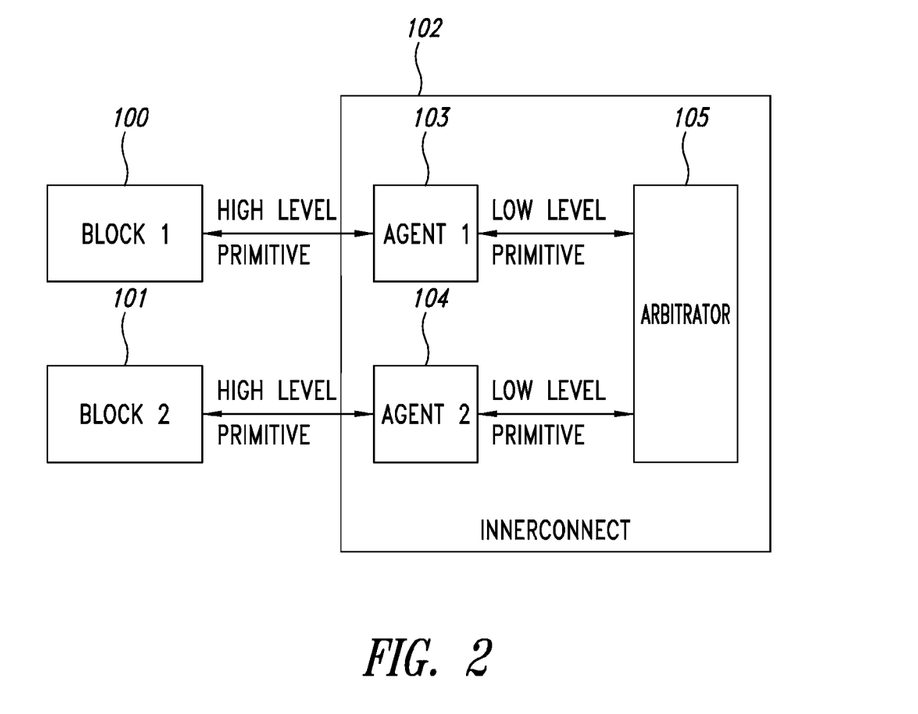
FIG. 2 illustrates the organization of the arbitration function within the system illustrated in FIG. 1.

FIG. 2 illustrates the organization of the arbitration function within a single system. Two functional blocks are shown, respectively block 100 and block 101, which communicate with an interconnect or data transfer device 102 via a group of high level arbitration primitives that will be discussed hereafter. It should be noted that the architecture that will be described is applicable to any type of system and any type of communication, such as communications between several computing units, or access to the same resource such as a shared memory etc.

Each functional block 100 or 101 communicates directly with a dedicated agent, respectively agent 103 and agent 104, by means of an unspecified communication link (series, parallel, optical coupling etc).

The main function of agents 103 and 104 is to translate a group of commands organized into high level primitives, received from functional blocks 100 and 101, into a low level primitive that can be directly handled by an unspecified arbitration mechanism, symbolized by arbitrator 105 in FIG. 2. The group of high level primitives exchanged between the block and its dedicated agent constitutes bi-directional communication link, in particular allowing the agent to transmit feedback information on received and executed commands.

In this manner, a considerable simplification of one of the essential functions within a single chip is carried out, namely inter-communication between various functional blocks that communicate via an interconnect 102.

I. High level protocol

High level primitives can be standardized, at least in practice, which ensures that development teams can easily integrate any new functional block within an already existing architecture. The high level primitives allow the communication of information between each functional block (101 for example) and its dedicated agent, and more specifically they allow transfer of commands expressing performance needs, these commands being transmitted by the associated functional block: volume of data to be transferred, requirements in terms of data rate and data transfer time, etc.

In the new architecture that is proposed, the agent dedicated to a block is responsible for translating information into one or more corresponding components in the critical rank vector that will be transmitted to the arbitrator. To this end, the agent will be able to use other information allowing such conversion, and in particular the fill level of its own internal FIFO. Thus, according to the filling state of the FIFO, a single command of rate presented by a given functional block could be translated differently in the critical rank vector generated by the agent.

It is clear that this system is very flexible, which allows autonomous components, such as agents 103 and 104, to modulate needs according to a given situation and to transmit, to arbitrator 105, information it can use directly, as will be seen hereafter.

In a preferred embodiment, a transmit rate command is used that makes it possible to ensure a medium flow towards the agent. Similarly, the high level protocol comprises a receive rate command making it possible to ensure reception of a medium flow.

In a particular embodiment, purge or flush commands are added in the high level protocol for purging the memory FIFO of an agent, beyond a preset time. These commands can be directly processed by the agent in order to produce and generate a vector having an adequate critical rank and input to arbitration block 105.

Preferably, the high level protocol comprises a command making it possible to define a processing request with minimum latency in order to allocate the data bus to a functional block requesting it as fast as possible.

In a preferred embodiment, the high level protocol comprises a command making it possible to define a processing request in the remaining band in order to allow the allocation of the data bus only once the minimum latency requests set by other agents have been satisfied.

The various commands are received by the agents that establish a suitable strategy to generate an adequate critical rank vector allowing flow regulation.

For illustration, we will now describe a specific embodiment comprising a group of fifteen commands that people qualified in the art will be able to adapt to a given specific application.

A first command generated by the functional block is used to define a maximum amount of data to be transmitted by the interconnect to a destination.

A second command generated by the block is used to define the maximum time of end of data transfer to destination.

A third command defines the total time during which the block will not be able to transmit data to the agent during the total transfer.

A fourth command specifies the maximum and minimum rate for data transmission between the block and the agent.

A fifth command defines the minimal and maximum amount of burst data sent by the block.

A sixth command defines the maximum or minimal time between two data bursts.

A seventh command defines the maximum number of bursts during transfer.

An eighth command defines maximum time data will wait in any part of the interconnect before it reaches its destination.

A ninth command defines the exact size of the next data burst to be transmitted.

A tenth command defines the exact time before transmission of the next data burst. These commands are particularly useful to the agent that can plan the flows to be transmitted and deduce an adequate strategy for generating critical rank vectors.

An eleventh command specifies a minimal amount of free temporary storage necessary in the agent to store all the data transferred by the block.

A twelfth command specifies a minimal amount of data available in the agent, ready to be provided to the block.

A thirteenth command known as <<purging>> specifies flushing of data in transit or awaiting transit in the interconnect, within a defined maximum time.

A fourteenth command specifies flushing of data in transit in the interconnect and destruction of data awaiting transit in the agent, within a defined maximum time.

A fifteenth command defines updating of one of the previously listed parameters in order to modify the execution of a previously received command.

The preceding command set, and in particular the first three ones that define the volume of transmit data and the maximum time of data transfer, are particularly useful in some applications that require specific processing within a predetermined time, such as for example video processing applications or mpeg decoding.

More specifically, the preceding commands could also be completed by commands associated to priority levels, which will make it possible to determine a hierarchy between various commands.

It can be noted that system constraints, as expressed by functional blocks, are clearly separated from the practical implementation of the arbitration mechanism control, which is now devolved to agents, and this feature constitutes one of the significant advantages of the invention.

Moreover, clearly separating arbitration control and functional blocks, allows working out adapted strategies and leads to great sophistication of the agents that will then allow optimal regulation of resource allocation such as data bus or interconnect—which is no longer under the control of functional blocks—which finally leads to more fluidity in flow transfers via the data bus.

Moreover, an agent will be allowed to use parallel load counters or reverse counters to satisfy commands sent by a block. Using these counters, the agent will know the amount of data to transmit, the number of remaining bursts, the time remaining until the next reception of data, the time remaining before data must absolutely be transmitted, etc. Thus, from all these elements the agent will be able to permanently compute, for example by means of an ALU or of any other means, the values of each component of the critical rank vector. The curve representing all the values of a component can resemble a succession of slopes, periods and variable levels with longer or shorter plateaus.

II. Low level protocol

According to one of the principles of the invention, agents 103 and 104 negotiate resource allocation with arbitrator 105 by means of low level primitives that are based on a critical rank vector comprising a number n of components having numerical values generated by the agents.

This critical rank vector comprises only numerical values and is very easy to handle by arbitrator 105. Therefore, the arbitrator doesn't need to deal with other particular specific constraints relating to the various functional blocks.

As a result the various functional blocks or units, such as units or blocks 100 or 101, communicate with great ease, while keeping the same arbitration mechanism 105.

Generally, arbitration mechanism 105 can be any known mechanism, in particular fixed or dynamic priority mechanisms, mechanisms known to people qualified in the art as ROBIN ROUND and ROUND ROBIN FAIR etc.

Figure 3:
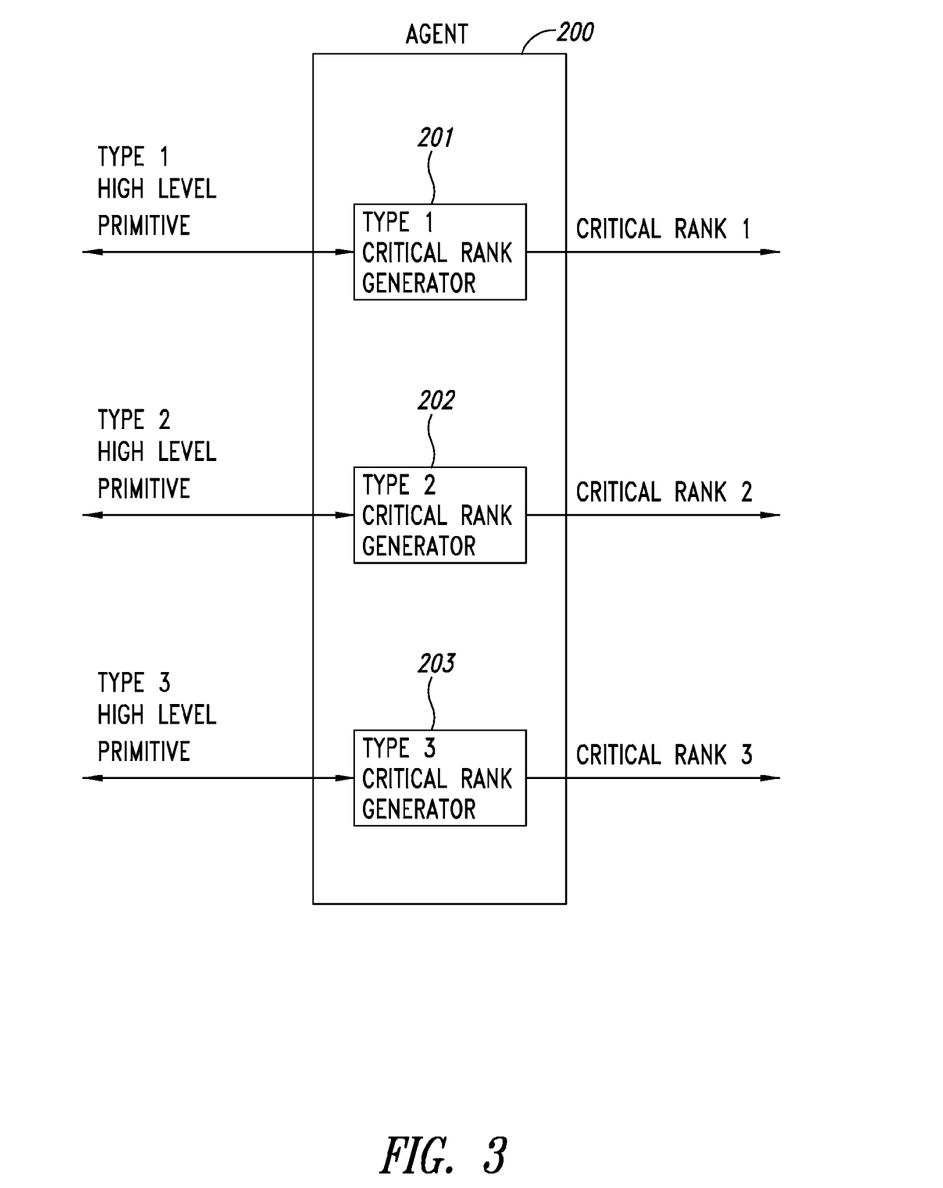
FIG. 3 illustrates the generation of a critical rank vector within an agent in accordance with the invention.

Preferably, as shown in FIG. 3, the agent generates a critical rank vector, preferably composed of three components.

To determine such a critical rank vector, the agent has a great latitude. Not only can it use information extracted from the high level commands transmitted by the functional block to which it is attached, but also internal information and in particular information about the fill level of its FIFO memory, if necessary.

The agent can thus work out any strategy for generating the critical rank vector, which strategy is no longer the problem of the functional block designer who will only have to set the minimal system constraints that will be transmitted via the high level protocol by means of adequate commands.

The agent can further use multiple algorithms to ensure control of the arbitration mechanism implemented by block 105.

With a critical rank vector one component of which evolves with time as a slope, the agent is ensured the interconnect will be allocated within a certain amount of time, which can allow it to conform to constraints received by the functional block, this without disturbing the operation of the arbitration mechanism too much.

Other mechanisms are possible according to strategies that will be applied, such as limiting mechanisms to ensure a block does not unduly monopolize the interconnect resource. As can be seen, once again, the invention allows great flexibility in managing the arbitration mechanism, flexibility that was not allowed in known mechanisms.

The critical rank vector generated by the agents can then be very easily handled by an arbitration mechanism receiving rival vectors from various agents.

III. Arbitration mechanism

People qualified in the art will be able to adapt any arbitration mechanism for handling of critical rank vectors generated by various agents competing on the same interconnect.

Preferably, arbitration block 105 is realized by means of a maximum or minimum extraction device as described below. To this end, a conversion function, hereafter referred to as "T-transform", such as defined in U.S. patent application Ser. No. 10/743,274 filed on Dec. 22, 2003 by the applicant of this patent application and entitled DEVICE FOR THE COLLECTIVE PROCESSING OF DATA, which document is mentioned in the present patent application simply as reference. The T-transform described in this patent application makes it possible to generate an intermediate coding of each component B of the critical rank vector that must be used.

Each component B is itself considered as a vector in the form B[n−1] B[n−2] . . . B[2] B[1] B[0] in which a ranking relationship is defined and transformed into a binary number composed of $2^n-1$ binary elements T[x]:

$$T[2^n-1] \; T[2^n-2] \ldots T[x] \ldots T[2] \; T[1] \text{ with } x=1$$
$$\text{with } 2n-1$$

Where T(x)=0 when x is strictly higher than R and T(x)=1 when x is lower than or equal to R, with R being the rank of vector B[n−1] B[n−2] . . . B[2] B[1] B[0] in said ranking relationship, namely, in an example with decimal values:

$$R = B[n-1] \times 2^{(n-1)} + B[n-2] \times 2^{(n-2)} + \ldots + B[2] \times 2^2 + B[1] \times 2^1 + B[0] \times 2^0.$$

It is observed that this definition of rank R gives the present T-transform the following characteristics: first, there is a bijective relationship between the binary code and its T-transform. Secondly, any binary element T(x) of the T-transform is «1» only when lower bits are also "ones".

Thus, for example, for a 3-bit coded component B there will be the following correspondences:

| Initial binary code | T-Transform | Rank |
| --- | --- | --- |
| 000 | 0000000 | 0 |
| 001 | 0000001 | 1 |
| 010 | 0000011 | 2 |
| 011 | 0000111 | 3 |
| 100 | 0001111 | 4 |
| 101 | 0011111 | 5 |
| 110 | 0111111 | 6 |
| 111 | 1111111 | 7 |

This conversion allows the extraction of a maximum among several components presented by different agents, such as agents 103 and 104. Indeed, while referring to FIG. 4, it can be noted that the maximum value of a component among a group of 8 components presented by eight agents, such as agents 103 and 104 for example, can be very easily extracted—and in a really very quick way.

Alternatively, it is possible to consider a second type of T-transform, based on the previously defined ranking relationship, whose decimal value <<0>> is transformed into a sequence of <<0>> and bit LSB is equal to 1. By way of illustration, we will show the correspondence for this second definition of a T-transform applied to 4-bit coded values:

| Initial binary code | T-Transform | Rank |
|---|---|---|
| 0000 | 0000000000000001 | 0 |
| 0001 | 0000000000000011 | 1 |
| 0010 | 0000000000000111 | 2 |
| 0011 | 0000000000001111 | 3 |
| 0100 | 0000000000011111 | 4 |
| 0101 | 0000000000111111 | 5 |
| 0110 | 0000000001111111 | 6 |
| 0111 | 0000000011111111 | 7 |
| 1000 | 0000000111111111 | 8 |
| 1001 | 0000001111111111 | 9 |
| 1010 | 0000011111111111 | 10 |
| 1011 | 0000111111111111 | 11 |
| 1100 | 0001111111111111 | 12 |
| 1101 | 0011111111111111 | 13 |
| 1110 | 0111111111111111 | 14 |
| 1111 | 1111111111111111 | 15 |

Alternatively, if one adopts the convention according to which:

$T(x)=1$ when x is strictly higher than R and $T(x)=0$ when x is lower than or equal to R, with R being the rank in said ordered group, then the extraction of a maximum is obtained by means of a Boolean AND operation, carried out bit-to-bit on bit of component to process that have the same index, followed by a revere conversion of said transform. By combining a Boolean OR, carried out bit-to-bit on bits having the same index, followed by a reverse conversion of said transform, the extraction of the minimum of a group of numerical values can be obtained in a very short time.

As can be noted, a T-transform has an aptitude for many combinations and data processing.

When referring to the first definition of the T-transform—whereby decimal "0" corresponds to transform <<000000 . . . 00>>, it can be noted that the rank of the converted value is directly obtained from the addition of the various binary elements contained in the converted value.

$$R=T[2^n-1]+T[2^n-2]+T[2^n-3]+ \ldots +T[2]+T[1]$$

Moreover, such T-transformation can be used very advantageously to produce circuits allowing high-speed collective data processing. This leads to a new class of electronic circuits, designed either manually or using a compilation and logical synthesis tool, which allows particularly fast processing of groups of data.

Figure 4:
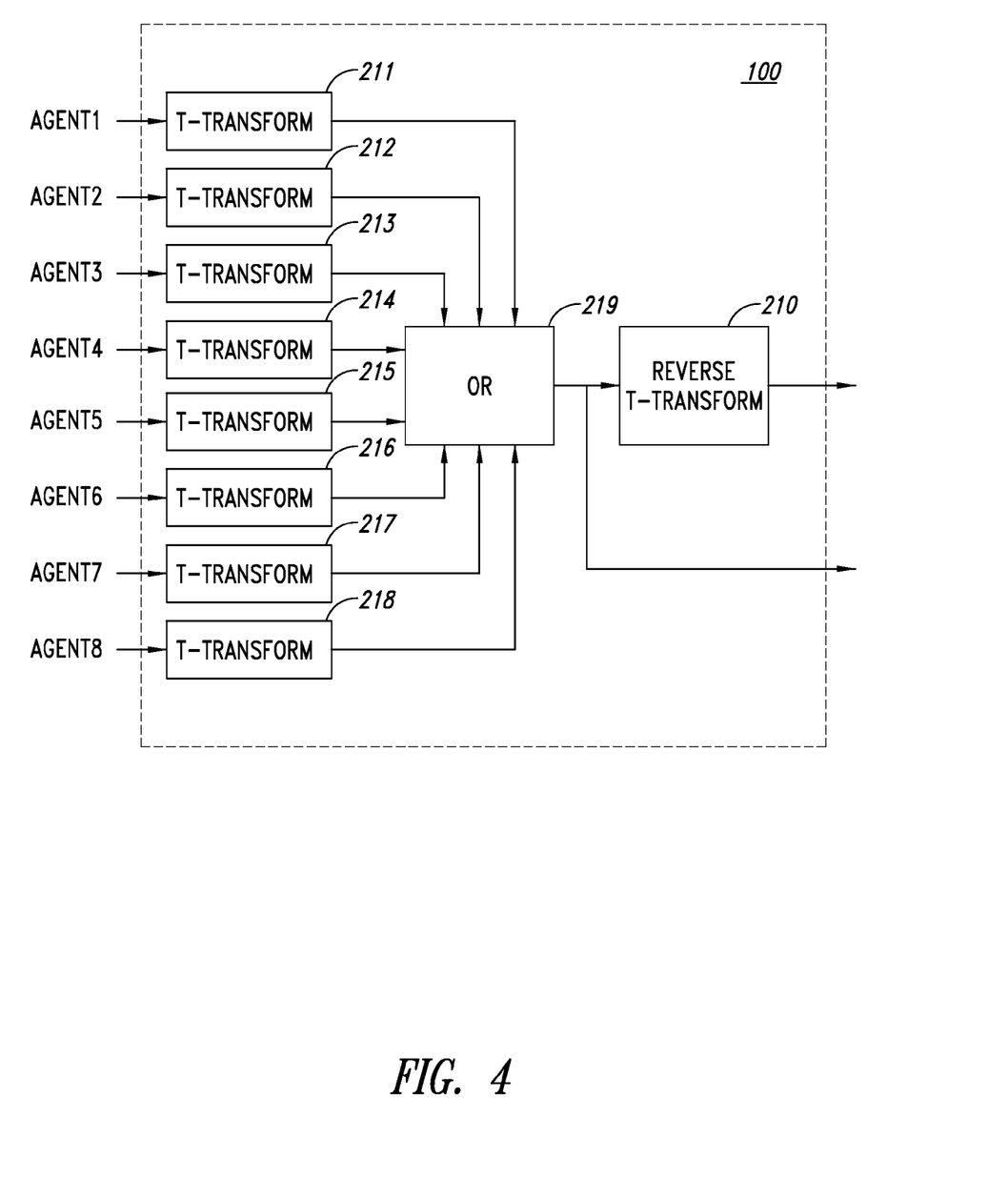
FIGS. 4 and 5 illustrate the process of extraction of a maximum in the arbitration mechanism.

Referring to FIG. 4, it is noted that each of the eight components of a critical rank vector generated by an agent is transmitted to the input of a converter circuit, respectively 211 to 218, that outputs the T-transform corresponding to the value.

The eight values are then transmitted to a converter circuit 219 that performs a logical OR—bit-to-bit, on bits having the same index—between the various values provided by blocks 211 to 218. Circuit 219 then outputs a value that is transformed by a converter circuit 210 performing a reverse T-transform conversion.

It can be noted, from the diagram of FIG. 4, that all T-conversions can be carried out at the same time and consequently, processing of the eight values can be obtained in only three steps. The processing time is independent of the number of values to process. To process 128 values, for example, a group of 128 T-transforming circuits will be enough.

Thus, the extraction of the maximum of a group of data can be obtained extremely rapidly. The greater the number of data to be processed, the higher the ratio of the gain provided by the invention, regarding speed.

An additional arbitration mechanism is used to uniquely select a transfer request to be validated, when there are several identical maximum values in the group of values from the maximum to be extracted. Such a mechanism can be implemented by using any known arbitration mechanism.

The previously described maximum extraction mechanism is located within arbitration block 105 in order to allow collective processing of the various components of the critical rank vectors generated by the various agents.

In a dual way, the extraction of a minimum could be carried out by means of the T-transform, in order to process a component of a representative critical vector, and in particular, a time constraint like the time remaining before the request can be satisfied.

Figure 5:
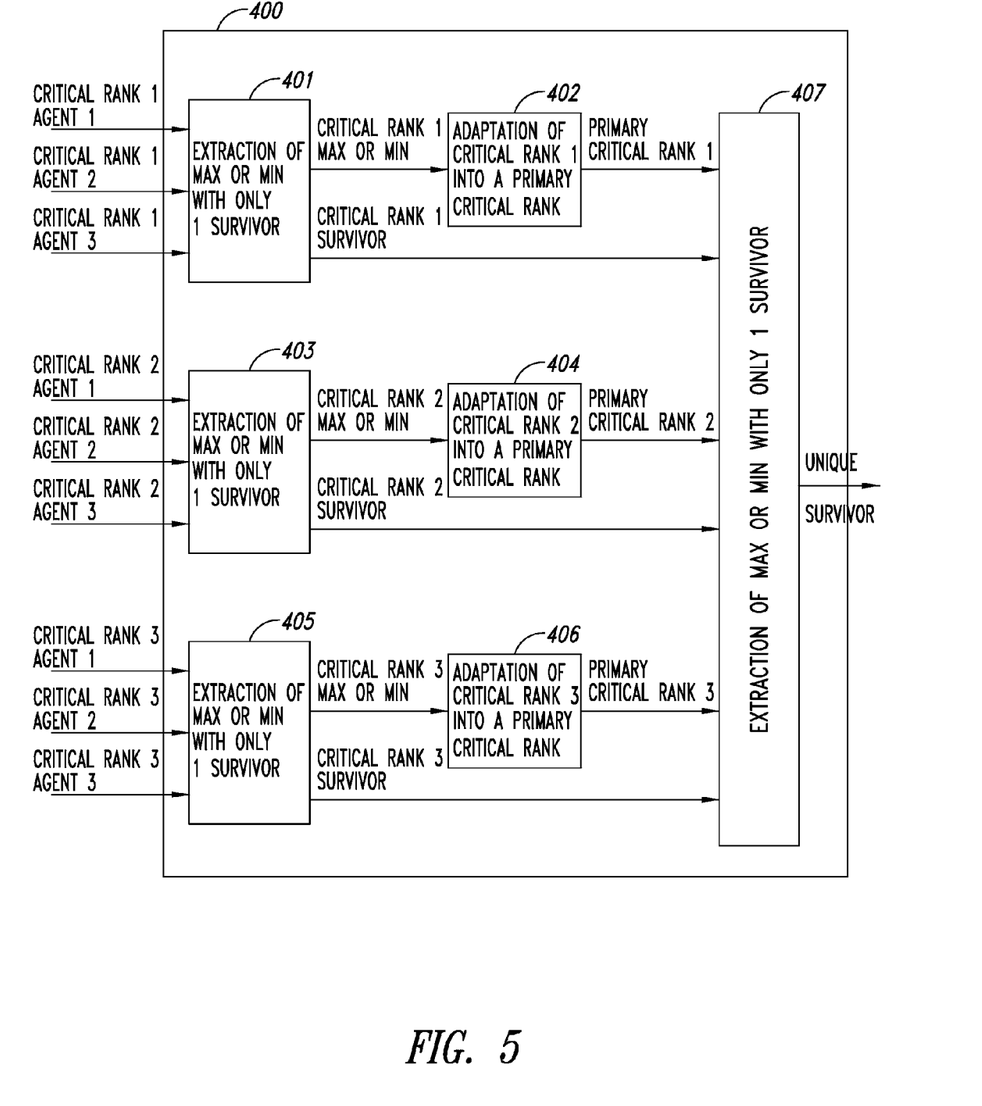

This processing is schematized in FIG. 5 where three critical rank vectors generated respectively by three agents are in competition within block 400.

A block 401 carries out the extraction of a maximum or a minimum among first components RC1, respectively from agents 1, 2 and 3. At the output, a surviving agent has been identified, and the numerical value of the considered component has been determined. This value is input to a block 402 for generating a primary critical rank that will be transmitted to maximum or minimum extractor 407. Block 402 makes it possible to adapt the level of the value before processing by block 407. In one of the preferred embodiments, block 402 comprises a gain or attenuation element, a limiter, or even a threshold effect.

Similarly, a block 403 allows the extraction of a maximum or a minimum among second components RC2, from agents 1, 2 and 3 respectively. At the output of block 403, a surviving agent has been identified and the numerical value of the considered component has been determined, which value is input to a block 404, similar to previously described block 402.

Lastly in FIG. 5, a block 405 extracts the maximum or the minimum of a component RC3, from each agent 1, 2 or 3 respectively. At the output of block 403, a surviving agent has been identified and the numerical value of the considered component has been determined, which value is input to a block 406, similar to blocks 402 and 404.

Maximum or minimum extraction block 407 thus makes it possible to perform cascade processing to identify a single survivor among the critical rank vectors presented by the various agents and, consequently, to allocate the interconnect or the resource to be allocated.

As can be seen, this mechanism is extremely flexible and powerful in particular when advantageously using the previously mentioned T-transform that allows effectiveness and speed of execution. Agents are responsible for dealing with the interpretation of system constraints and with commands presented by functional blocks, and arbitration is performed based only on critical rank vectors that are easy to handle, as was shown here.

Thus, the use of a high level control protocol, translated into a low level protocol by an agent using a critical rank vector, associated with an arbitration mechanism that extracts a maximum or a minimum, makes it possible to realize an interconnect that separates system constraints from the various functional blocks to which the system is connected and, provides an adaptive generic arbitration mechanism whose transfer performances are dynamically optimized.

All of the above U.S. patents, U.S. patent application publications, U.S. patent applications, foreign patents, foreign patent applications and non-patent publications referred to in this specification and/or listed in the Application Data Sheet,are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An arbitration method for a data transfer device in an architecture that includes n functional blocks, access to a resource by said functional blocks being regulated by an arbitration block, the method comprising:
exchanging information from a first one of said functional blocks via high level primitives defining particular commands selected from a subset of commands, and generating in response to said high level primitives a first critical rank vector that includes first and second components that are numerical values;
exchanging information from a second one of said functional blocks via high level primitives defining particular commands selected from a subset of commands, and generating in response to said high level primitives a second critical rank vector that includes first and second components that are numerical values;
receiving the critical rank vectors generated and applying an arbitration mechanism to at least one of the components of the critical rank vectors to uniquely identify the block accessing said resource; and
performing an adaptation function acting at least on one of said critical rank vector components.

2. An arbitration method according to claim 1 wherein applying the arbitration mechanism includes applying a maximum or minimum extraction mechanism to at least one of the components of the critical rank vectors to uniquely identify the block accessing said resource.

3. An arbitration method according to claim 1 wherein the high level primitives include commands allowing transmission of data volume information, time information, rate information or minimum latency information.

4. An arbitration method according to claim 3 wherein the high level primitives include a command allowing purging of data awaiting transfer, within a maximum defined time, by sending such data to its destination or by destroying it.

5. An arbitration method according to claim 1 wherein said adaptation function is a limiter, gain, shift or threshold effect function.

6. An arbitration method according to claim 1 wherein applying the arbitration mechanism is performed by an arbitrator that comprises a first and a second arbitration block mounted in cascade and receiving respective ones of said first and second components of one of said critical rank vectors.

7. An arbitration method according to claim 6 wherein one of said first and second arbitration blocks includes said adaptation function.

8. An arbitration method according to claim 1, further comprising applying a conversion function, using a T-transform, of each component of said critical rank vectors, each component being in a form B[n−1] B[n2] . . . B[2] B[1] B[0], said conversion function operating on a group of elements in which a ranking relationship is defined, and changing each critical rank vector into a binary number composed of $2^n-1$ binary elements T[x] with x=1 with $2^n-1$:

$$T[2^n-1]\ T[2^n-2]\ \ldots\ T[x]\ \ldots\ T[2]\ T[1]$$

where T(x)=0 when x is strictly higher than R and T(x)=1 when x is lower than or equal to R, R being a rank of vector B[n−1] B[n−2] . . . B[2] B[1] B[0] in said ranking relationship.

9. An arbitration method according to claim 1, further comprising applying a conversion function, using a T-transform of each component of said critical rank vectors, each component being in the form B[n−1] B[n−2] . . . B[2] B[1]B0], said conversion function operating on a group of elements in which a ranking relationship is defined, and changing each critical rank vector into a binary number composed of $2^n-1$ binary elements T[x] with x=1 with $2^n-1$:

$$T[2^n-1]\ T[2^n-2]\ \ldots\ T[x]\ \ldots\ T[2]\ T[1]$$

where T(x)=1 when x is strictly higher than R and T(x)=0 when x is lower than or equal R, R being a rank of vector B[n−1] B[n−2] . . . B[2] B[1] B[0] in said ranking relationship.

10. An arbitration method for a data transfer device in an architecture having n functional blocks communicating via agents, said agents generating critical rank vectors having at least two elementary components, said method comprising:
generating a request to an agent allocated to one of said functional blocks, said request having data volume information, time information, rate information or minimum latency information, according to a high level protocol;
converting, by the agent, said request into a critical rank vector including at least a first and a second component that are numerical values;
providing rival critical rank vectors to an arbitrator having a mechanism to extract a maximum or minimum from at least one of said components; and
performing an adaptation function acting at least on one of said critical rank vector components.

11. An arbitration method according to claim 10 wherein the high level protocol comprises a command allowing purging of data awaiting transfer, within a maximum defined time, by sending such data to its destination or by destroying it.

12. An arbitration method according to claim 10 wherein said adaptation function is a limiter, gain, shift or threshold effect function.

13. An arbitration method according to claim 10 wherein the arbitrator comprises a first and a second arbitration block mounted in cascade and receiving respective ones of said first and second components.

14. An arbitration method according to claim 13 wherein one of said first and second arbitration blocks includes said adaptation function.

15. An arbitration method according to claim 10, further comprising applying a conversion function, using a T-transform of each component of said critical rank vector, each component being in the form B[n−1] B[n−2] . . . B[2] B[1] B[0], said conversion function operating on a group of elements in which a ranking relationship is defined, and changing the critical rank vector into a binary number composed of $2^n-1$ binary elements $T[x]$ with $x=1$ with $2^n-1$:

$$T[2^n-1] T[2^n-2] \ldots T[x] \ldots T[2] T[1]$$

where $T(x)=0$ when x is strictly higher than R and $T(x)=1$ when x is lower than or equal to R, R being a rank of vector $B[n-1]$ $B[n-2]$ ... $B[2]$ $B[1]$ $B[0]$ in said ranking relationship.

16. An arbitration method according to claim 10, further comprising applying a conversion function (T-transform) of each component of said critical rank vector, each component being in the form $B[n-1]$ $B[n-2]$ ... $B[2]$ $B[1]$ $B[0]$, said conversion function operating on a group of elements in which a ranking relationship is defined, and changing the critical rank vector into a binary number composed of $2^n-1$ binary elements $T[x]$ with $x=1$ with $2^n-1$:

$$T[2^n-1] T[2^n-2] \ldots T[x] \ldots T[2] T[1]$$

where $T(x)=1$ when x is strictly higher than R and $T(x)=0$ when x is lower than or equal to R, R being a rank of vector $B[n-1]$ $B[n-2]$ ... $B[2]$ $B[1n]$ $B[0]$ in said ranking relationship.

17. A data transfer device, comprising:
a set of agents that receive requests for access to said data transfer device from a set of functional blocks, respectively, each agent exchanging information via a high level protocol having at least data volume information, time information, rate information or minimum latency information, and each agent interpreting this information to respectively generate critical rank vectors including at least two components that are numerical values; and
an arbitrator receiving said critical rank vectors and having means for extracting a maximum or a minimum from at least one of said critical rank vector components, wherein said arbitrator includes an adaptation function acting at least on one of said critical rank vector components.

18. The data transfer device of claim 17 wherein the high level protocol comprises a command allowing purging of data awaiting transfer and contained in one of said agents, within a maximum defined time, by sending such data to its destination or by destroying it.

19. The data transfer device of claim 18 wherein said adaptation function is a limiter, gain, shift or threshold effect function.

20. The data transfer device of claim 17 wherein said arbitrator comprises at least a first and a second arbitration block mounted in cascade and receiving one of said first and second components of said critical rank vector, respectively.

21. The data transfer device of claim 20 wherein one of said first and second arbitration blocks comprises an adaptation block that performs said adaptation function.

22. An agent for an architecture of a semiconductor product that includes a set of functional blocks organized around a data transfer device, said agent allowing communication with a functional block and comprising:
means for receiving information from said functional block via a high level protocol, the information including at least data volume information, time information, rate information or minimum latency information; and
means for interpreting the information to generate a critical rank vector including at least two components that are numerical values, said components to be forwarded to an arbitration mechanism with maximum or minimum extraction,
wherein the high level protocol includes a command allowing purging of data awaiting transfer, within a maximum defined time, by sending such data to its destination or by destroying it.

23. An agent according to claim 22, further comprising means for providing information, relating to execution of currently processed high level commands, to said functional block.

* * * * *

UNITED STATES PATENT AND TRADEMARK OFFICE
CERTIFICATE OF CORRECTION

PATENT NO. : 7,315,909 B2 Page 1 of 1
APPLICATION NO. : 11/039644
DATED : January 1, 2008
INVENTOR(S) : Denis Lehongre It is certified that error appears in the above-identified patent and that said Letters Patent is hereby corrected as shown below:

Column 10
Line 18, "component being in the form B[n-1] B[n-2]" should read as -- component being in a form B[n-1] B[n-2] --

Column 10
Line 26, "when x is lower than or equal R, R being a rank of vector" should read as -- when x is lower than or equal to R, R being a rank of vector --

Column 10
Line 65, "component being in the form B[n-1] B[n-2]" should read as -- component being in a form B[n-1] B[n-2] --

Column 11
Line 10, "comprising applying a conversion function (T-transform) of" should read as -- comprising applying a conversion function, using a T-transform, of --

Column 11
Line 12, "being in the form B[n-1] B[n-2]" should read as -- being in a form B[n-1] B[n-2] --

Column 11
Line 21, "...B[2] B[1n] B[0] in said ranking" should read as -- ...B[2] B[1] B[0] in said ranking --

Signed and Sealed this

Third Day of March, 2009

JOHN DOLL
*Acting Director of the United States Patent and Trademark Office*